United States Patent
Medeiros Destro et al.

(10) Patent No.: US 12,327,112 B2
(45) Date of Patent: Jun. 10, 2025

(54) COMPLIANCE ADAPTION PLANS AND SOFTWARE COMPONENT MATCHMAKING

(71) Applicant: International Business Machines Corporation, Armonk, NY (US)

(72) Inventors: Juliana Medeiros Destro, Indaiatuba (BR); Flavio Gilberto De Souza, Estiva Gerbi (BR); Diego Aparecido Wolfshorndl, Piracicaba (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 17/533,188

(22) Filed: Nov. 23, 2021

(65) Prior Publication Data

US 2023/0161585 A1 May 25, 2023

(51) Int. Cl.
*G06F 8/73* (2018.01)
*G06F 21/60* (2013.01)
*G06F 40/242* (2020.01)

(52) U.S. Cl.
CPC ............ *G06F 8/73* (2013.01); *G06F 21/60* (2013.01); *G06F 40/242* (2020.01)

(58) Field of Classification Search
CPC .......... G06F 8/73; G06F 21/60; G06F 40/242
USPC ................................................. 717/120–123
See application file for complete search history.

(56) References Cited

U.S. PATENT DOCUMENTS

| | | | |
|---|---|---|---|
| 8,234,641 B2 * | 7/2012 | Fitzgerald | G06F 21/577 |
| | | | 718/1 |
| 9,727,751 B2 * | 8/2017 | Oliver | H04L 63/102 |
| 9,729,583 B1 * | 8/2017 | Barday | G06Q 10/06 |
| 9,892,442 B2 | 2/2018 | Barday | |
| 10,043,035 B2 | 8/2018 | Lafever et al. | |
| 10,102,533 B2 | 10/2018 | Barday | |
| 10,127,147 B2 * | 11/2018 | Oberle | G06F 11/3688 |
| 10,331,898 B2 * | 6/2019 | Nefedov | G06F 21/62 |
| 10,445,513 B2 * | 10/2019 | Biswas | G06F 21/62 |
| 10,567,439 B2 | 2/2020 | Barday | |
| 10,572,684 B2 | 2/2020 | Lafever et al. | |

(Continued)

FOREIGN PATENT DOCUMENTS

| | | | | |
|---|---|---|---|---|
| CN | 111831979 A | 10/2020 | | |
| EP | 1675047 A1 * | 6/2006 | ............ | G06Q 10/06 |

(Continued)

OTHER PUBLICATIONS

Garcia-Galan et al., "Towards Adaptive Compliance", 2016, ACM, pp. 108-114. (Year: 2016).*

(Continued)

*Primary Examiner* — Ted T. Vo
(74) *Attorney, Agent, or Firm* — Erik K. Johnson

(57) ABSTRACT

Aspects of the invention include correlating a context of a written data privacy requirement with a first code segment of a source code of a target computer system. A selection of a first candidate code segment is received to replace the first code segment. The selected first candidate code segment is determined to have replaced the first code segment and is integrated into the source code. A stimulation signal is transmitted to the target computer system, wherein the stimulation signal is directed toward the first candidate code segment integrated into the source code.

20 Claims, 6 Drawing Sheets

(56) References Cited

U.S. PATENT DOCUMENTS

| | | | |
|---|---|---|---|
| 10,839,099 | B2 | 11/2020 | Vogel et al. |
| 11,024,299 | B1 * | 6/2021 | Drake .................. G10L 15/197 |
| 11,481,710 | B2 * | 10/2022 | Brannon ............ G06Q 10/0635 |
| 2014/0282837 | A1 | 9/2014 | Heise et al. |
| 2017/0270318 | A1 | 9/2017 | Ritchie |
| 2021/0056219 | A1 | 2/2021 | Sofer et al. |

FOREIGN PATENT DOCUMENTS

| | | |
|---|---|---|
| WO | 2017/214602 A1 | 12/2017 |
| WO | 2017/214608 A1 | 12/2017 |

OTHER PUBLICATIONS

Zhang et al., "A Differential Privacy Support Vector Machine Classifier Based on Dual Variable Perturbation", 2019, IEEE Access, pp. 98238-98251. (Year: 2019).*

Ayala-Rivera, et al., "The Grace Period Has Ended: An Approach to Operationalize GDPR Requirements" IEEE 26th International Requirements Engineering Conference (2018): 11 pages.

"Automate Compliance with Brazil's General Data Protection Law", Onetrust, retrieved from web https://www.onetrust.com/products/brazil-law-compliance/, dated Feb. 4, 2025, 8 pages.

"Python", retrieved from https://www.sourcetrail.com/, dated Feb. 4, 2025, 3 pages.

"Review Assistant—Code Review Tool", Marketplace, retrieved from web dated Feb. 4, 2025, 7 pages.

"The 5 Best GDPR Compliance Tools", Exin, retrieved from https://www.exin.com/article/the-5-best-gdpr-compliance-tools/ dated Feb. 4, 2025, 5 pages.

Ferrara et al. "Static Analysis for GDPR Compliance", Julia SRL, Verona, Italy, Nov. 2, 2019, 11 pages.

Grootendorst Maarten. "Keyword Extraction with Bert—A minimal method for extracting keywords and keyphrases", Medium, Oct. 29, 2020, 8 pages.

Vanezi et al. "A Formal Modeling Scheme for Analyzing a Software System Design against the GDPR", ENASE 2019: Proceedings of the 14th International Conference on Evaluation of Novel Approaches to Software Engineering, May 4, 2019, pp. 68-79.

Yang et al. "A Language for Automatically Enforcing Privacy Policies", POPL '12: Proceedings of the 39th annual ACM SIGPLAN-SIGACT symposium on Principles of programming languages, Jan. 25, 2012, pp. 85-96.

* cited by examiner

300

COMPLIANCE ADAPTION PLANS AND SOFTWARE COMPONENT MATCHMAKING

BACKGROUND

The present invention generally relates to programmable computer systems, and more specifically, to programmable computer systems configured for compliance adaptation and software component matchmaking.

Large-scale enterprises have digitally transformed their processes for manufacturing and delivering products throughout the globe. These enterprises have further leveraged the storage capacity of their cloud computing systems to store and analyze vast amounts of digital information about their customers. Commercial enterprises routinely update their data privacy protocols to adapt to changing customs, consumer preferences, and requirements. In many instances, the computer system administrators are tasked with reading a non-technical directive and figuring out how to adapt their computer system to conform to the directive. As compliance with a directive may require system changes across different jurisdictions, system administrators have to tailor their solutions to multiple jurisdictional scenarios.

SUMMARY

Embodiments of the present invention are directed to a computer-implemented method for compliance adaptation and software component matchmaking. A non-limiting example of the computer-implemented method includes correlating a context of a written data privacy requirement with a first code segment of a source code of a target computer system. A selection of a first candidate code segment is received to replace the first code segment. The selected first candidate code segment is determined to have replaced the first code segment and is integrated into the source code. A stimulation signal is transmitted to the target computer system, wherein the stimulation signal is directed toward the first candidate code segment integrated into the source code. Whether the source code with the first candidate code segment replacing the first code segment is in compliance with the written data privacy requirement is determined based on an output to the stimulation signal.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
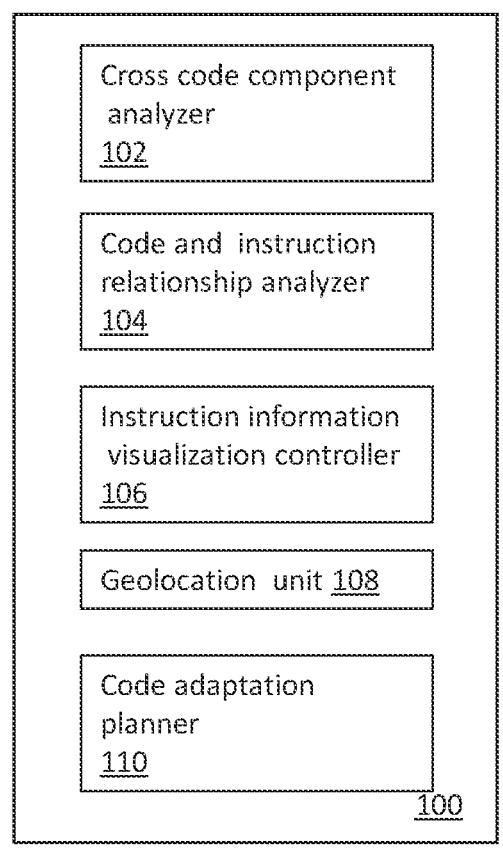
FIG. 1 illustrates a system for compliance adaptation and software component matchmaking in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computer systems, and computer program products that use a dependency graph to match the language of a written data privacy requirement with code segments that effectuate the requirement. This enables system administrators to identify non-compliant code and update a target computer system to comply with the written data privacy requirement. Furthermore, a geographic monitoring of the target computer system enables a system administrator to determine whether the target computer system is updated based on geographic requirements of the written data privacy requirement.

System administrators receive written data privacy requirements to implement and are tasked with updating their computer systems to comply with the requirements. These requirements can be in the form of an email from an executive, a company-wide memo, or a legal regulation (e.g., Europe's General Data Protection Regulations). In many instances, the written directive is not drafted by anyone with computer science expertise, or include any technical instructions. As a result, the system administrators adopt their own methodology for implementation of the required computer system updates. It is difficult for system administrators to discern an intended meaning of the directives as they are not written by a person who understands what updated a computer system entails. It is further difficult for system administrators to ascertain which systems need to be updated. For example, does a company's encryption processes for a database server in West Virginia need to be updated in response to a memo on data privacy written for retail operations in Brazil?

One or more embodiments of the present invention address one or more of the above-described shortcomings by providing computer-implemented methods, computer systems, and computer program products that receive the written data privacy requirement and use natural language processing techniques to discern the meaning of the requirement. The meaning of written data privacy requirement is used to match the requirement with the source code that needs to be updated. In addition to the source code directly affected by the requirement, code that is dependent from the affected source code is also identified. A proposed amended source code that places the computer system in compliance with the written data privacy requirement is retrieved and presented to the system administrator. If the source code is accepted, the source code and the dependent code are updated to comply with the written data privacy requirement.

Referring to FIG. 1, a system 100 for compliance adaptation and software component matchmaking is shown in accordance with one or more embodiments of the present invention. The system 100 includes a cross-code component analyzer 102 for correlating written data privacy requirement with affected computer system components. The system 100 further includes a code and requirement analyzer 104 for correlating written data privacy requirement with affected code related to the affected computer system components. The system 100 further includes a requirement information visualization controller 106 for presenting proposed updated code blocks to a software engineer. The system 100 further includes a geolocation unit 108 for determining whether the code for introducing code to comply with different requirements based on a geographic requirements of a written data privacy requirement. The system 100 further includes a code adaptation planner 110 for provisioning resources to effectuate the amendment of the code to comply with the written data privacy requirement. It should be appreciated that all or a portion of the functionality described herein can be performed on a cloud computing environment, such as the cloud computing environment 50 described in FIG. 4; or on a computer system, such as the computer system 600 described in FIG. 6.

The cross-code component analyzer 102 receives the text of a written data privacy requirement and associates the requirement with a component of a target computing system. In some embodiments of the present invention, the cross-code component analyzer 102 applies natural language processing (NLP) techniques to discern the meaning of the written data privacy requirement. The cross-code component analyzer 102 first preprocesses the text through a process of tokenization (sometimes referred to as text segmentation or lexical analysis) of the written data privacy requirement to separate the text into a list of tokens. The individual tokens can include, for example, individual words, phrases, sections, and sentences. The cross-code component analyzer 102 then uses the tokenized written data privacy requirement to derive a semantic meaning of the requirement. The cross-code component analyzer 102 applies NLP techniques, for example, a word-embedding model, to semantically analyze the written data privacy requirement. The cross-code component analyzer 102 maps the tokens to respective words vectors in a low-dimensional space. Various techniques can then be applied to derive a context of the written data privacy requirement. For example, the cross-code component analyzer 102 can take a target word for the embedding being learned and attempt to predict the surrounding context words from it. In another embodiment of the present invention, the cross-code component analyzer 102 analyzes the context of the words surrounding a masked target word and seeks to predict the target word based on the surrounding words. The cross-code component analyzer 102 is trained to semantically analyze text from the privacy domain. In an exemplary embodiment, the cross-code component analyzer 102 employs a trained artificial neural network, for example, a support vector machine (SVM), or other neural network appropriate for text analysis of the written data privacy requirement.

The cross-code component analyzer 102 applies the semantic meaning of the written data privacy requirement to determine which components of a computer system are affected by the requirement. For example, if an email from a chief operating officer states, "when we process data based on consent, our system needs be able to demonstrate that the consumer has agreed to process his or her personal data", the cross-code component analyzer 102 is trained to associate the meaning with at least a user interface of the system that receives a consent, and a data storage of the system that stores the consent. In some embodiments of the present invention, the cross-code component analyzer 102 accesses a text description of each component of a target computer system. For example, a target computer system includes a database, a terminal, and a communication network. In this instance, each of the components includes a description for the cross-code component analyzer 102 to review and compare with the written data privacy requirement. In some embodiments of the present invention, the cross-code component analyzer 102 is trained to associate keywords in the text of the written data privacy requirement with particular target computer system components. The cross-code component analyzer 102 can also use a dictionary to associate words generated to describe a context of a written data privacy requirement with particular target computer system components. For example, if a memo uses the phrase "when a customer enters their information", the cross-code component analyzer 102 contextually associates the phrase with a user interface. The cross-code component analyzer 102 then associates "user interface" with "display unit", "peripheral devices", and "communication protocol".

The code and requirement relationship analyzer 104 receives an identity of each affected component of a target computing system and identifies target source code that is related to those components. The code and requirement analyzer 104 further identifies code that is dependent from the related source code. In some embodiments of the present invention, the code and requirement analyzer 104, generates a directed dependency graph that describes dependencies of code segments for a target computer system. Each node of the directed dependency graph describes a code segment of the source code. Each edge of the dependency graph describes a code dependency between two connected nodes. The code and requirement analyzer 104 further identifies the classes, functions, and methods in the source code and associates them with the nodes in the directed dependency graph. The code and requirement analyzer 104 receives keywords and context of the written data privacy requirement from the cross-code component analyzer 102. The code and requirement analyzer 104 then uses the dependency graph to associate the keywords and context with the source code. For example, if the written data privacy requirement includes the phrase "user data", the code and requirement analyzer 104 can use the dependency graph to associate the phrase with the class "userData" found in source code located at a node of the directed dependency graph. By identifying the class "userData" in a segment of the source code, the code and requirement analyzer 104 determines that the code segment is affected by the requirement. The code and requirement analyzer 104 further uses the dependency graph to determine whether the code segment is dependent from another code segment, or is another code segment dependent from it.

The requirement information visualization controller 106 receives the identified segments of code affected by the written data privacy requirement. The requirement information visualization controller 106 accesses a code database and retrieves updated code to replace the affected code. The database is comprised of code that has been updated to comply with the written data privacy requirement. In some embodiments of the present invention, the requirement information visualization controller 106 compares the affected code with candidate code to retrieve code that is functionally compliant with the written data privacy requirement. This is different than retrieving functionally similar code, as the functionally similar code would have the same non-compliance issues as the affected code. For example, if the affected code relates to a database management system, the requirement information visualization controller 106 first retrieves candidate code segments for a database management system. The requirement information visualization controller 106 then analyzes the candidate code segments for code that matches the context of the written data privacy requirement.

For example, a new company privacy initiative requires that browsing history data must be deleted after thirty days. The cross-code component analyzer 102 uses the determined context of the written data privacy requirement to determine that the requirements affect server storage located in South America. The requirement information visualization controller 106 analyzes the current source code regulating the server storage and determines that the current source code does not require that the browser histories be deleted after thirty days. The requirement information visualization controller 106 retrieves candidate code segments relating to database management from a code database. The requirement information visualization controller 106 then analyzes the candidate code segments to find code that matches the context of the written data privacy requirement, for example, source code and dependent code that deletes a browser history from stored memory. Candidate code segments that do not include functional code for deleting a browser history from stored memory are eliminated as candidate code segments.

The system 100 further includes a geolocation unit 108 for determining a geospatial requirements of the written data privacy requirement. For example, a multi-national company may have issued a written data privacy requirement in Africa that a certain data class can only be accessed through a multi-factor authentication. However, upon analyzing the requirement and another requirement from an Asian division of the company, the cross-code component analyzer 102 determines that the requirement is necessary in Africa, but not in Asia. Therefore, the geolocation unit 108 introduces a conditional code to the set of candidate code segments. The introduced conditional code sets a condition for when the execution of a selected candidate code segment. The introduced conditional code segment includes, for example, an if/else statement, and permits a target computer system to bypass a written data privacy requirement based on geographics. For example, assume the above-referenced multi-national company has its data storage servers in Africa. The target computer system receives a first request for information from Africa. The conditional code causes the target computer system to request the IP address of the requestor. Based on the IP request, the target computer system determines that the requestor is in Africa and causes the data server to receive an acknowledgement of a multi-factor authorization prior to releasing the data. The target computer system also receives a request for the same data, but from Europe. This time the requested IP address confirms that the requestor is in Europe. Upon execution of the conditional code, the data server does not require acknowledgement of a multi-factor authorization and transmits the requested data.

The code adaptation planner 110 estimates a cost for replacing each segment of affected source code. For example, the code adaptation planner 110 identifies the lines of the original source code affected by the written data privacy requirement. The code adaptation planner 110 then determines a number of lines of candidate code needed to replace the affected source code. The code adaptation planner 110 then estimates a cost for replacing the affected source code with the candidate code. For example, the code adaptation planner 110 uses a k-nearest neighbor (K-NN) to find a number of candidate code segments based on keywords in the candidate code segments that match the context of a written data privacy requirement. The code adaptation planner 110 then retrieves a cost for updating a system with each candidate code segment. The code adaptation planner 110 retrieves a candidate code segment previously used to update another database management system. The code adaptation planner 110 retrieves a time taken to update the other database management system. Based on the time taken to update the other database management system, the code adaptation planner 110 estimates a time required to update the current database management system software.

The code adaptation planner 110 further presents the candidate code segments, including dependent code segments, and costs to a system administrator. The system administrator can select a candidate code segment, including dependent code segments, from the candidate code segments. The code adaptation planner 110 receives a selection and then prepares the computer system for the software update. For example, the code adaptation planner 110 provisions computing resources, such as processors and memory, to prepare for the code replacement. The code adaptation planner 110 copies and back up any data that is manipulated by the replaced code. The code adaptation planner 110 then generates a virtual machine(s) to execute a trial run of the affected component of the target computer system using the selected candidate code segments. The virtual machine includes copies of any applications, memory, instructions necessary to execute the updated code. Based on the results of the trial run, code adaptation planner 110 determines whether the selected candidate code segment places the computer system in compliance with the written data privacy requirement. The trial run is isolated from the operations of the actual target computer system via the virtual machine(s). Therefore, the code adaptation planner 110 is able to perform the trial run using the virtual machine(s) without affecting the functioning of the target computer system. For example, if a written data privacy requirement determines that certain personal information has to be encrypted, the code adaptation planner 110 creates a virtual machine and imports a portion of the data to be encrypted. The code adaptation planner 110 then executes the selected candidate code segment to determine if the code does cause the data to be encrypted. If the data does become encrypted, the code adaptation planner 110 replaces the affected code segment with the selected candidate code segment. If the data does not become encrypted, the code adaptation planner 110 presents the candidate code segment to the system administrator without the previously selected candidate code segment.

The code adaption planner 110 further determines that the selected candidate code segment is integrated with the target computer system. The code adaption planner 110 verifies the impact of the code replacement to the original source code in order to meet the written privacy policy requirement. In some embodiments of the present invention, the code adaption planner 110 relies on existing sets of unit tests to determine the replaced source code still performs the same sets of functionalities of the original target computer system (i.e., based on the input of a unit test, the expected output is returned). The code adaption planner 110 initiates one or more stimulation signals designed to stimulate the replacement source code. The code adaption planner 110 then compares output signals to expected output signals to identify if the unit test touches code that was modified to meet the written privacy policy requirement. For example, the code adaptation planner 110 verifies whether a data that includes personally identifiable information was encrypted pursuant to the replacement code. In other embodiments of the present invention, the code adaption planner 110 further identifies if the unit test touches any code dependent from the source code that was modified to meet the written privacy policy requirement. The code adaptation planner 110 references the directed dependency graph to determine each dependent code segment. The code adaptation planner 110 monitors runtime data to determine whether the dependent code was invoked by the stimulation signal. The code adaption planner 110 reports in the unit test output plus highlights of the code that were modified and code that by the written privacy policy requirement in the unit test report. In the instance that dependent code identified by the directed dependency graph was not touched by execution of the replacement source, the code adaption planner 110 also identifies these segments in the report. To accomplish this, each unit test needs to be executed with original and modified code for comparison purpose.

The code adaptation planner 110 engages a neural network to determines whether the output corresponds to the written data privacy requirement. The cross code component analyzer 102 is trained to associate the written data privacy requirement with the affected computer system components. The code adaptation planner 110 engages a neural network trained to predict whether the output matches the written data privacy requirement. For example, a written data privacy requirement email reads, "we must institute greater protection of our consumer data". The system 100 has determined that the options for executing this requirement are data encryption and adding a new firewall. The system administrator selects a candidate code segment that adds an additional firewall to protect the data. Upon determining that the candidate code segment has been integrated into the target computer system, the code adaptation planner 110 transmits a stimulation signal to determine whether the candidate code segment has created an additional firewall. The code adaptation planner 110 collects the output signal and uses the neural network, for example a neural network executing a word embedding model, to correlate the context of the written privacy directive with the output.

The phrases "neural network" and "machine learning" broadly describe a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using system 100, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The system 100 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the system 100 that carry electronic messages between simulated neurons are provided with numeric weights that correspond to the strength or weakness of a given connection. During training, The weights can be adjusted and tuned based on experience, making the system 100 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 2:
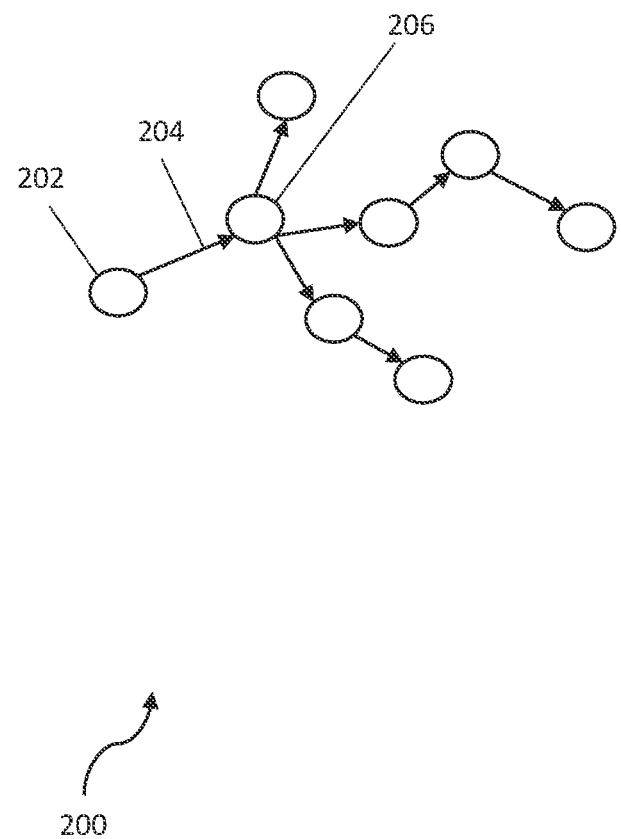
FIG. 2 illustrates a dependency graph for compliance adaptation and software component matchmaking in accordance with one or more embodiments of the present invention.

Referring to FIG. 2, a portion of a directed dependency graph 200 of code segments, according to one or more embodiments of the present invention, is shown. The code and requirement analyzer 104 identifies a first code segment of a source code. The code and requirement analyzer 104 then creates a first node 202 to describe the first code segment. The code and requirement analyzer 104 then identifies a second code segment that is dependent from the first code segment. The code and requirement analyzer 104 then creates a second node 206 to describe the first code segment. The code and requirement analyzer 104 then creates a first edge 204 connecting the first node 202 and the second node 206. Each time a new dependent code is identified, a subsequent new edge and node are generated. As a code segment affected by a written data privacy requirement is identified, the code and requirement analyzer 104 uses the directed dependency graph 200 and identifies each code segment that is dependent from the affected code segment.

Figure 3:
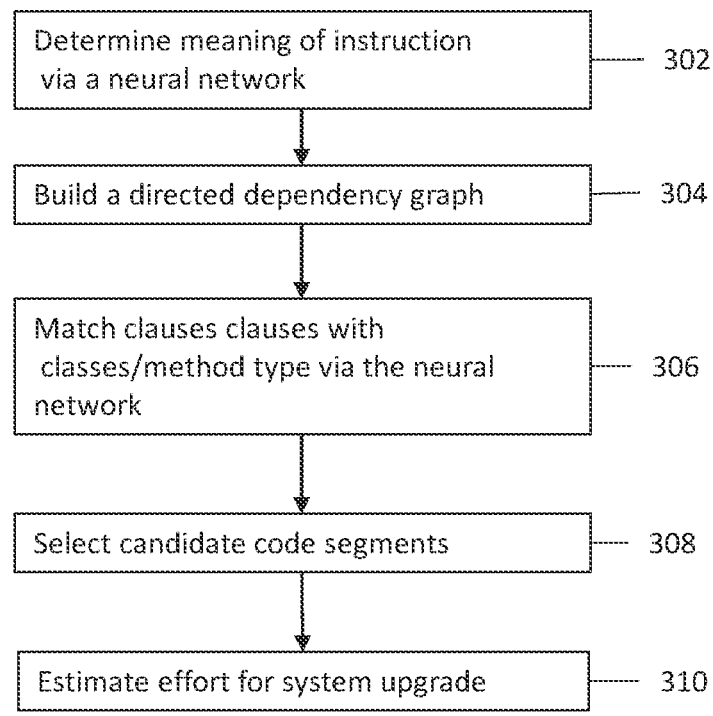
FIG. 3 illustrates a process flow for compliance adaptation and software component matchmaking in accordance with one or more embodiments of the present invention.

Referring to FIG. 3, a process 300 for compliance adaptation and software component matchmaking is shown in accordance with one or more embodiments of the present invention. It should be appreciated that some or all of the steps described by FIG. 3 can be performed by a computer system, for example, the computer system 600 of FIG. 6. At block 302, a cross-code component analyzer 102 analyzes a written data privacy requirement to determine a context of the requirement. In some embodiments of the present invention, the cross-code component analyzer 102 is implemented as a neural network and applies a word-embedding model to discern a meaning of the written data privacy requirement. Based on the context of the written data privacy requirement, the cross-code component analyzer 102 determines which components of a target computer system are affected by the requirement.

At block 304, a code and requirement analyzer 104 retrieves a source code directed towards the affected components of the target computer system. The code and requirement analyzer 104 generates a directed dependency graph describing segments of an affected source code and source code that is dependent from the affected source code. Each node of the directed dependency graph describes a segment of the source code. Each edge of the directed dependency graph describes a dependency between two connected nodes. As part of the analysis, the code and requirement analyzer 104 further identifies the classes, functions, and methods described in the source code.

At block 306, the code and requirement analyzer 104 matches a determined context of the written data privacy requirement with the code. In some embodiments of the present invention, the code and requirement analyzer 104 is implemented as a neural network and applies natural language processing techniques to correlate the context of a written data privacy requirement with the code segments. In other embodiments of the present invention, the code and requirement analyzer 104 accesses a dictionary, that cross-references context with code language found in the classes, functions, and methods described in the source code. With this step, the language of the source code is matched with the context of the written data privacy requirement. The code and requirement analyzer 104 can now identify which components of a computer system are affected by a written data privacy requirement and which segments of the source code, including dependent code are affected by the written data privacy requirement.

At block 308, the requirement information visualization controller 106 presents candidate code segment(s) to replace the affected code segment(s). In some embodiments of the present invention, the requirement information visualization controller 106 accesses a database of code segments and retrieves candidate code segments related to the computer system components affected by the written data privacy requirement. The requirement information visualization controller 106 then accesses a dictionary that correlates the context of the written data privacy requirement with the code language of the retrieved code segments. The requirement information visualization controller 106 then selects codes segments that include language correlated to the written data privacy requirement context.

At block 310, a code adaptation planner 110 estimates a respective cost for replacing affected source code with a candidate code segment. The costs can include an estimated time and resources used to replace the affected source code. To determine the cost, the code adaptation planner 110 can access historical data of other computer systems that have replaced similar code for written data privacy requirement compliance.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
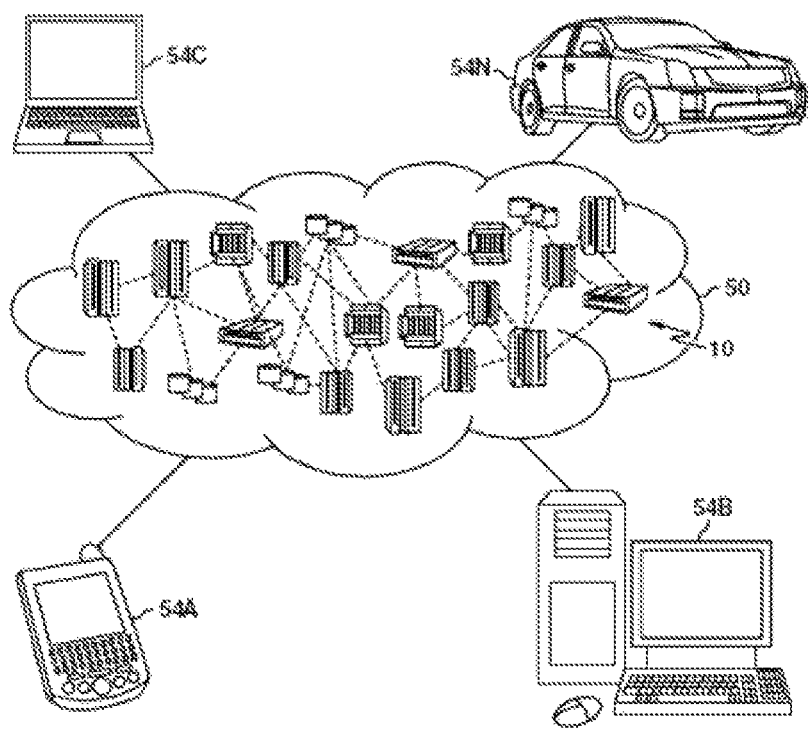
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
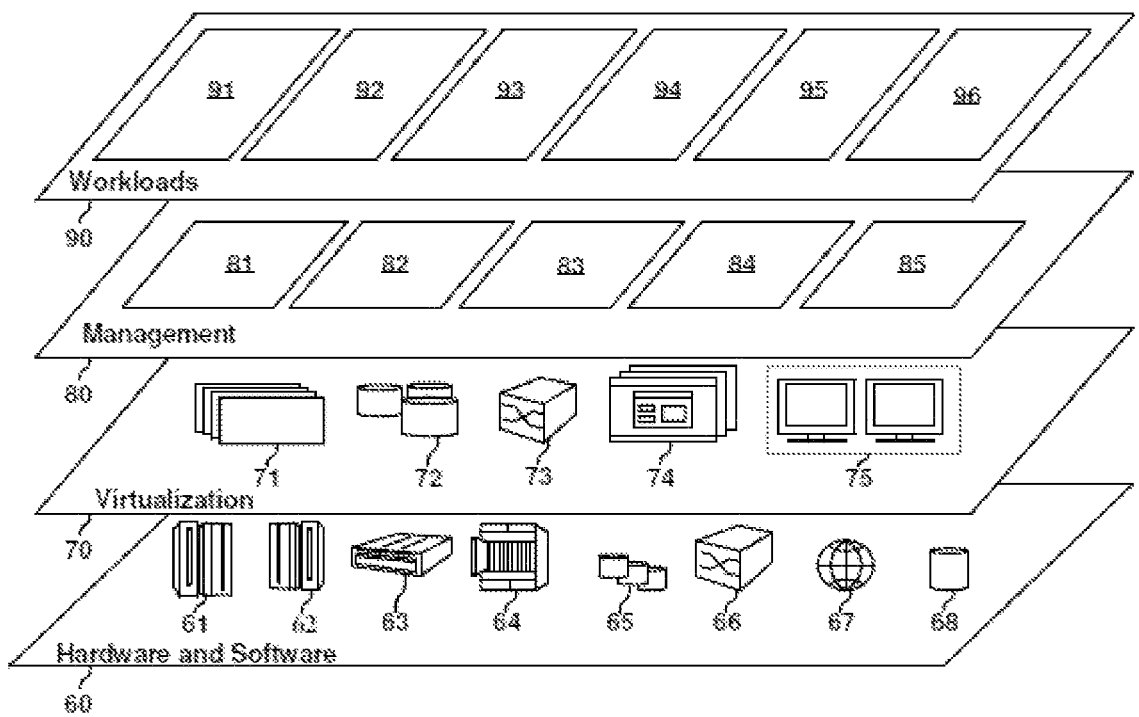
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and written data privacy requirement compliance adaptation and software component matchmaking 96.

Figure 6:
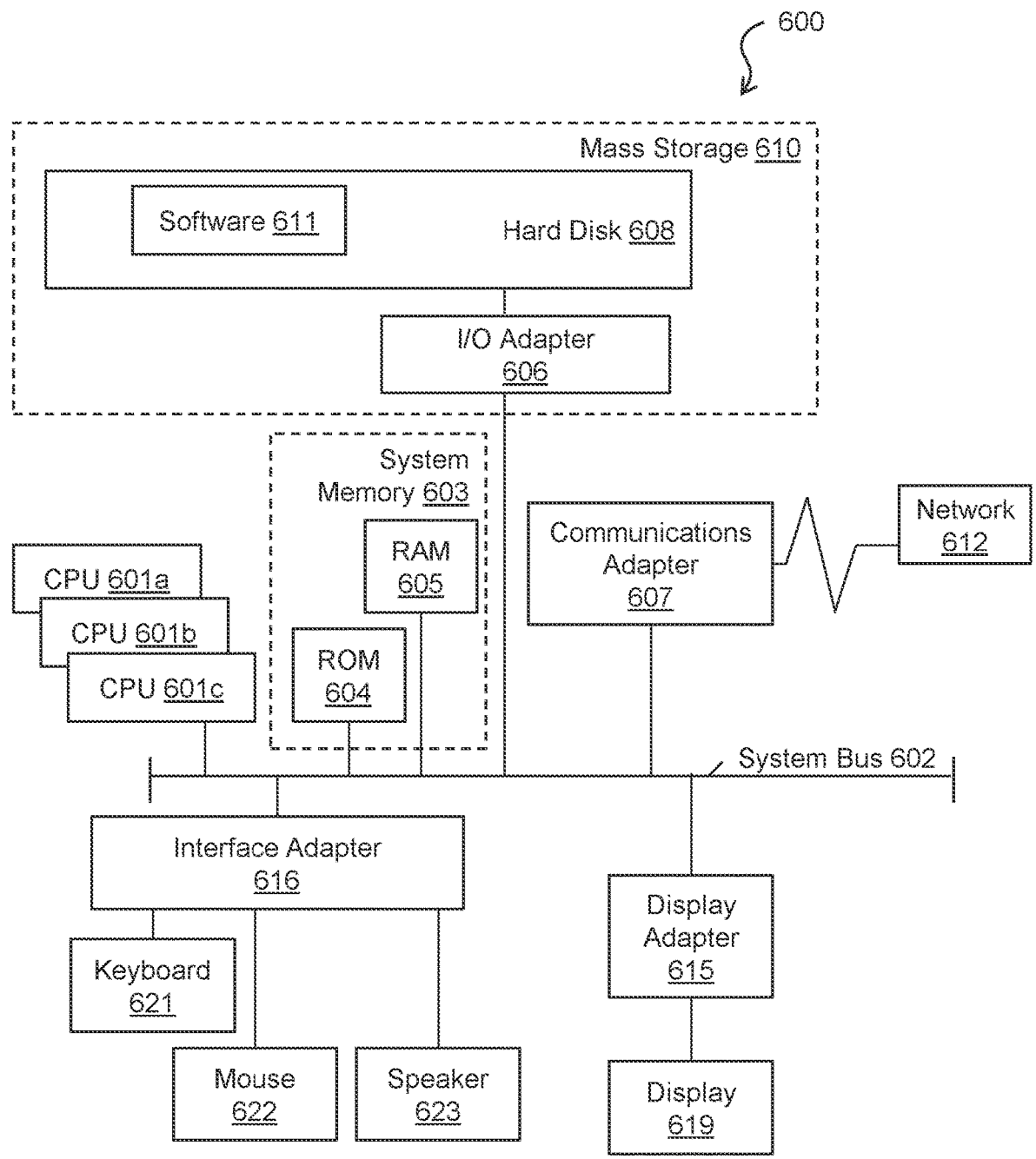
FIG. 6 illustrates a block diagram of a computer system for use in implementing one or more embodiments of the present invention.

In one or more embodiments of the present invention, the hardware/software modules in the system 100 from FIG. 1 can be implemented on the computer system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node, such as a node 10 of FIG. 4. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    correlating, by a processor, a context of a written data privacy requirement with a first code segment of a source code of a target computer system;
    receiving, by the processor, a selection of a first candidate code segment to replace the first code segment;
    determining, by the processor, that the selected first candidate code segment has replaced the first code segment and is integrated into the source code;
    transmitting, by the processor, a stimulation signal to the target computer system, wherein the stimulation signal is directed toward the first candidate code segment integrated into the source code; and
    determining, by the processor, whether the source code with the first candidate code segment replacing the first code segment is in compliance with the written data privacy requirement based on an output to the stimulation signal.

2. The computer-implemented method of claim 1, wherein the method further comprises generating a virtual machine to execute the source code with the candidate code segment replacing the first code segment.

3. The computer-implemented method of claim 1, wherein the method further comprises:
    analyzing, via natural language techniques, the written data privacy requirement to determine the context of the written data privacy requirement;
    accessing a dictionary to correlate the context of the written data privacy requirement with a component of the target computer system; and
    selecting the first candidate code segment based on the correlated component of the target computer system.

4. The computer-implemented method of claim 3, wherein the method further comprises:
    selecting a plurality of candidate code segments that are related to the correlated component of the target computer system;
    accessing a dictionary to determine a correlation between the context of the written data privacy requirement with the plurality of candidate code segments; and
    selecting the first candidate code segment based on the correlation.

5. The computer-implemented method of claim 1, wherein the method further comprises:
    generating a directed dependency graph comprising a plurality of nodes and edges, wherein each node of the plurality of nodes describes a code segment of the source code, and wherein each edge of the plurality of edges describes a dependency between two code segments of the source code; and
    identifying a second code segment that is dependent from the first code segment based on the directed dependency graph.

6. The computer-implemented method of claim 1, wherein the method further comprises:
    receiving a selection of the first candidate code segment; and
    provisioning computing resources of the target computer system, such as processors and memory to prepare for replacing the first code segment.

7. The computer-implemented method of claim 1, wherein the method further comprises estimating a cost for replacing the first code segment with the first candidate code segment.

8. A system comprising:
    a memory having computer readable instructions; and
    one or more processors for executing the computer readable instructions, the computer readable instructions controlling the one or more processors to perform operations comprising:
    correlating a context of a written data privacy requirement with a first code segment of a source code of a target computer system;
    receiving a selection of a first candidate code segment to replace the first code segment;
    determining that the selected first candidate code segment has replaced the first code segment and is integrated into the source code;
    transmitting a stimulation signal to the target computer system, wherein the stimulation signal is directed toward the first candidate code segment integrated into the source code; and
    determining whether the source code with the first candidate code segment replacing the first code segment is in compliance with the written data privacy requirement based on an output to the stimulation signal.

9. The system of claim 8, wherein the operations further comprise generating a virtual machine to execute the source code with the first candidate code segment replacing the first code segment.

10. The system of claim 8, wherein the operations further comprise:
- analyzing, via natural language techniques, the written data privacy requirement to determine the context of the written data privacy requirement;
- accessing a dictionary to correlate the context of the written data privacy requirement with a component of the target computer system; and
- selecting the first candidate code segment based on the correlated component of the target computer system.

11. The system of claim 10, wherein the operations further comprise:
- selecting a plurality of candidate code segments that are related to the correlated component of the target computer system;
- accessing a dictionary to determine a correlation between the context of the written data privacy requirement with the plurality of candidate code segments; and
- selecting the first candidate code segment based on the correlation.

12. The system of claim 8, wherein the operation further comprise:
- generating a directed dependency graph comprising a plurality of nodes and edges, wherein each node of the plurality of nodes describes a first code segment of the source code, and wherein each edge of the plurality of edges describes a dependency between two code segments of the source code; and
- identifying a second code segment that is dependent from the first code segment based on the directed dependency graph.

13. The system of claim 8, wherein the operations further comprise:
- receiving a selection of the first candidate code segment; and
- provisioning computing resources of the target computer system, such as processors and memory to prepare for replacing the first code segment.

14. The system of claim 8, wherein the operations further comprise estimating a cost for replacing the first code segment with the first candidate code segment.

15. A computer program product comprising a computer readable storage medium having program instructions embodied therewith, the program instructions executable by a processor to cause the processor to perform operations comprising:
- correlating a context of a written data privacy requirement with a first code segment of a source code of a target computer system;
- receiving a selection of a first candidate code segment to replace the first code segment;
- determining that the selected first candidate code segment has replaced the first code segment and is integrated into the source code;
- transmitting a stimulation signal to the target computer system, wherein the stimulation signal is directed toward the first candidate code segment integrated into the source code; and
- determining whether the source code with the first candidate code segment replacing the first code segment is in compliance with the written data privacy requirement based on an output to the stimulation signal.

16. The computer program product of claim 15, wherein the operations further comprise generating a virtual machine to execute the source code with the first candidate code segment replacing the first code segment.

17. The computer program product of claim 15, wherein the operations further comprise:
- analyzing, via natural language techniques, the written data privacy requirement to determine the context of the written data privacy requirement;
- accessing a dictionary to correlate the context of the written data privacy requirement with a component of the target computer system; and
- selecting the first candidate code segment based on the correlated component of the target computer system.

18. The computer program product of claim 17, wherein the operations further comprise:
- selecting a plurality of candidate code segments that are related to the correlated component of the target computer system;
- accessing a dictionary to determine a correlation between the context of the written data privacy requirement with the plurality of candidate code segments; and
- selecting the first candidate code segment based on the correlation.

19. The computer program product of claim 15, wherein the operations further comprise:
- generating a directed dependency graph comprising a plurality of nodes and edges, wherein each node of the plurality of nodes describes a first code segment of the source code, and wherein each edge of the plurality of edges describes a dependency between two code segments of the source code; and
- identifying a second code segment that is dependent from the first code segment based on the directed dependency graph.

20. The computer program product of claim 15, wherein the operations further comprise:
- receiving a selection of the first candidate code segment; and
- provisioning computing resources of the target computer system, such as processors and memory to prepare for replacing the first code segment.

* * * * *